(12) United States Patent
Perumangatt et al.

(10) Patent No.: US 11,586,093 B2
(45) Date of Patent: Feb. 21, 2023

(54) METHOD AND SYSTEM FOR CONVERTING POSITION OR MOMENTUM CORRELATION OF PHOTON PAIRS TO A POLARIZATION ENTANGLED PHOTON PAIR

(71) Applicant: NATIONAL UNIVERSITY OF SINGAPORE, Singapore (SG)

(72) Inventors: Chithrabhanu Perumangatt, Singapore (SG); Lohrmann Alexander, Singapore (SG); Alexander Ling, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 25 days.

(21) Appl. No.: 17/282,617

(22) PCT Filed: Oct. 4, 2019

(86) PCT No.: PCT/SG2019/050500
§ 371 (c)(1),
(2) Date: Apr. 2, 2021

(87) PCT Pub. No.: WO2020/072005
PCT Pub. Date: Apr. 9, 2020

(65) Prior Publication Data
US 2022/0206360 A1 Jun. 30, 2022

(30) Foreign Application Priority Data
Oct. 4, 2018 (SG) .......................... 10201808768Y

(51) Int. Cl.
G02F 1/35 (2006.01)
G02F 1/39 (2006.01)
H04B 10/70 (2013.01)

(52) U.S. Cl.
CPC .............. *G02F 1/3526* (2013.01); *G02F 1/39* (2013.01); *H04B 10/70* (2013.01)

(58) Field of Classification Search
CPC .................................................. G02F 1/3526
See application file for complete search history.

(56) References Cited

U.S. PATENT DOCUMENTS 6,424,665 B1 * 7/2002 Kwiat .................. H01S 3/1083
372/27
7,211,812 B2   5/2007 Takeuchi
(Continued)

FOREIGN PATENT DOCUMENTS

| CN | 103278996 A | 9/2013 |
| CN | 104752944 A | 7/2015 |
| CN | 207541825 U | 6/2018 |

OTHER PUBLICATIONS

Alessandro Fedrizzi, Thomas Herbst, Andreas Poppe, Thomas Jennewein, Anton Zeilinger, Optics Express, vol. 15, Issue 23, pp. 15377-15386, Year: 2007, DOI: 10.1364/OE.15.015377.
(Continued)

*Primary Examiner* — Rhonda S Peace
(74) *Attorney, Agent, or Firm* — Volpe Koenig

(57) ABSTRACT

A method of, and module for, converting position or momentum correlation of correlated photon pairs to a polarization entangled photon pair, and a source for polarization entangled photon pairs. The method comprises a conversion step of separating the correlated photon pairs into first and second groups based on their generated position at the crystal (position correlation) or their direction about the propagation axis (momentum correlation) and rotating a polarization of the first correlated photon pair group such that the polarization of the first correlated pair group is at 90 degrees relative to the polarization of the second correlated photon pair group; and a combining step of combining the
(Continued)

first and second correlated photon pairs such that at least respective portions of respective spatial distributions of the first and second photon pair groups overlap with negligible wavelength dependent phase difference.

20 Claims, 5 Drawing Sheets

(56) References Cited

U.S. PATENT DOCUMENTS

| | | | |
|---|---|---|---|
| 7,489,436 | B1 | 2/2009 | Fiorentino |
| 8,222,623 | B2 * | 7/2012 | Trojek .................. H04L 9/0852 356/417 |
| 2003/0007086 | A1 | 1/2003 | Bean |
| 2008/0037996 | A1 | 2/2008 | Spillane |
| 2008/0049302 | A1 | 2/2008 | Jarutis |
| 2008/0063015 | A1 | 3/2008 | Trifonov |
| 2008/0075410 | A1 | 3/2008 | Spillane |
| 2009/0016386 | A1 | 1/2009 | Edamatsu |
| 2013/0258453 | A1 | 10/2013 | Arahira |
| 2021/0006337 | A1 * | 1/2021 | Ling ...................... H04B 10/70 |
| 2022/0206360 | A1 * | 6/2022 | Perumangatt .......... H04B 10/70 |

OTHER PUBLICATIONS

M. V. Jabir & G. K. Samanta; Scientific Reports, vol. 7, Article No. 12613, Date: Oct. 3, 2017.

P. Trojek, M. Bourennane, H. Weinfurter, and Ch. Kurtsiefer, 2003 European Quantum Electronics Conference. EQEC 2003 (IEEE Cat No. 03TH8665), Date of Conference: Jun. 22-27, 2003 DOI: 10.1109/EQEC.2003.1314235.

Steinlechner, Fabian, et al. "Efficient heralding of polarization-entangled photons from type-0 and type-II spontaneous parametric down conversion in periodically poled KTiOPO 4." JOSA B 31.9 (2014): 2068-2076].

Villar, Aitor, Alexander Lohrmann, and Alexander Ling. "Experimental entangled photon pair generation using crystals with parallel optical axes." Optics express 26.10 (2018): 12396-12402].

Extended Search Report mailed in corresponding European Patent Application No. 19869178.4 dated May 11, 2022, consisting of 8 pp.

* cited by examiner

METHOD AND SYSTEM FOR CONVERTING POSITION OR MOMENTUM CORRELATION OF PHOTON PAIRS TO A POLARIZATION ENTANGLED PHOTON PAIR

CROSS REFERENCE TO RELATED APPLICATIONS

This application is a national stage entry of International Patent Application No. PCT/SG2019/050500 filed on Oct. 4, 2019 based on Singapore Patent Application No. 10201808768Y filed Oct. 4, 2018, which applications are incorporated by reference herein as fully set forth.

FIELD OF INVENTION

The present invention relates broadly to a method and system for converting position or momentum correlation of photon pairs to a polarization entangled photon pair.

BACKGROUND

Any mention and/or discussion of prior art throughout the specification should not be considered, in any way, as an admission that this prior art is well known or forms part of common general knowledge in the field.

A source of polarization entangled photons is one of the basic requirements for laboratory research in quantum communication. Moreover, quantum key distribution networks require compact and robust entangled photon sources which can withstand vibrations and temperature fluctuations.

Hence, bright and stable sources of polarization entangled photon pairs are of great interest in quantum communication. The most popular way of generating such photon pairs is through spontaneous parametric down conversion (SPDC) of a laser beam in a second order nonlinear crystal. One of the main concerns for the design of such sources is the phase stability of the generated state against temperature fluctuations and vibrations. As the phase is directly related to the pump laser wavelength, the fluctuations in the central wavelength of the pump will degrade the entangled state. In critically phase matched designs [Villar, Aitor, Alexander Lohrmann, and Alexander Ling. "Experimental entangled photon pair generation using crystals with parallel optical axes." Optics express 26.10 (2018): 12396-12402], angular instability in the alignment of the nonlinear crystals will contribute to the phase instability of the generated state. Specifically, [1] describes a method that utilizes the two coherent SPDC processes to generate photon pairs entangled in polarization.

In quasi-phase matched designs [Steinlechner, Fabian, et al. "Efficient heralding of polarization-entangled photons from type-0 and type-II spontaneous parametric down conversion in periodically poled KTiOPO 4." JOSA B 31.9 (2014): 2068-2076] the whole process depends also on the thermal fluctuations in the temperature bath in which the periodically poled crystal is mounted. Both sources of instability are severe limitations for the application of entangled photon sources. Moreover, high bright polarization entangled photons are created by superposing photon states from two SPDC processes which are orthogonal to each other. This quantum superposition is done via interferometry which involves mirrors and beam splitters. Hence such designs have relatively larger foot print and are vulnerable to misalignments due to mechanical vibrations.

Embodiments of the present invention seek to address at least one of the above problems.

SUMMARY

In accordance with a first aspect of the present invention, there is provided a method of converting position or momentum correlation of correlated photon pairs to a polarization entangled photon pair, the method comprising:
 a conversion step of separating the correlated photon pairs into first and second groups based on their generated position at the crystal (position correlation) or their direction about the propagation axis (momentum correlation) and rotating a polarization of the first correlated photon pair group such that the polarization of the first correlated pair group is at 90 degrees relative to the polarization of the second correlated photon pair group; and
 a combining step of combining the first and second correlated photon pairs such that at least respective portions of respective spatial distributions of the first and second photon pair groups overlap with negligible wavelength dependent phase difference.

In accordance with a second aspect of the present invention, there is provided a module for converting position or momentum correlation of correlated photon pairs to a polarization entangled photon pair, the module comprising:
 a polarization optics for rotating the polarization of a first group of the correlated photon pairs such that a polarization of the first correlated photon pair group is at 90 degrees relative to a second group of the correlated photon pairs; and
 a combiner for combining the first and second correlated photon pair groups such that at least respective portions of respective spatial distributions of the first and second photon pair groups overlap with negligible wavelength dependent phase difference.

In accordance with a third aspect of the present invention, there is provided a source for generating polarization entangled photon pairs, comprising the module of the second aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1A:
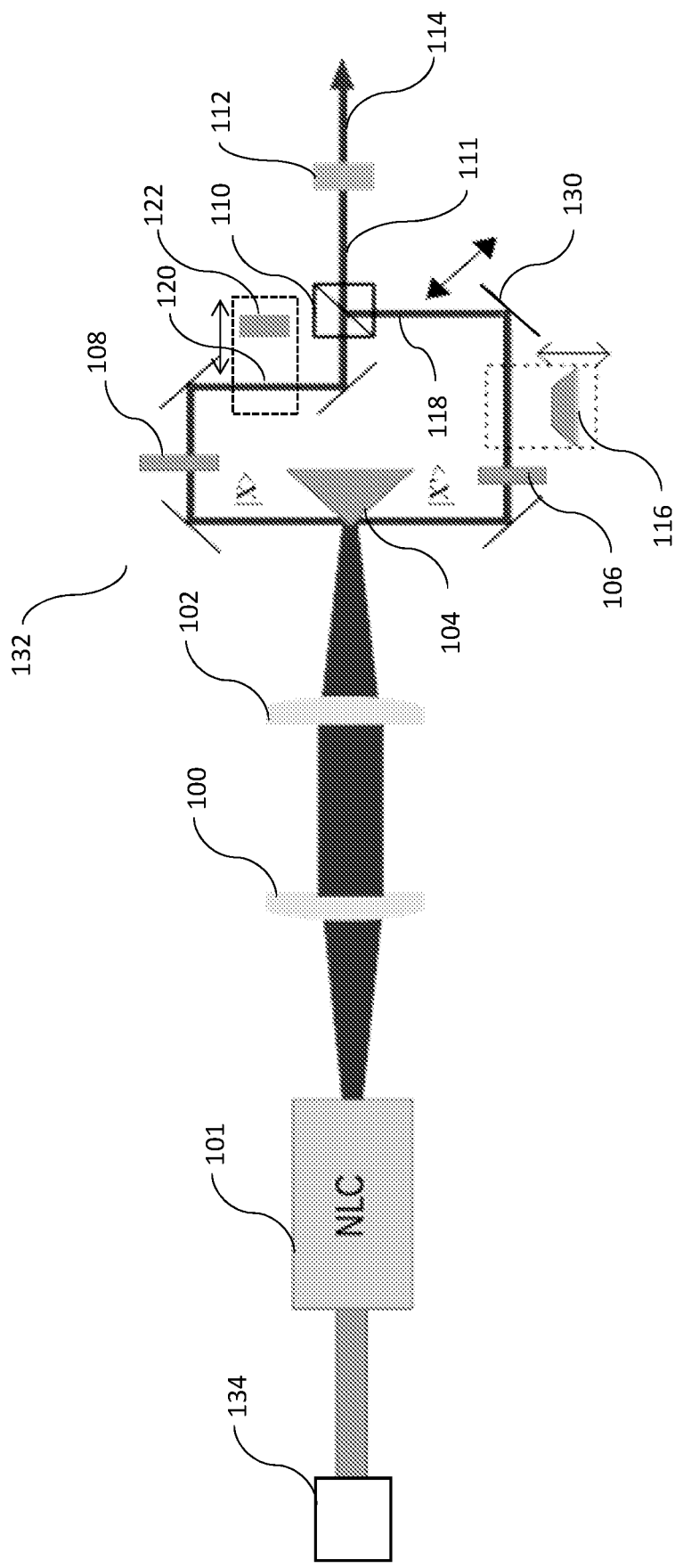
FIG. 1A shows a schematic diagram illustrating a method and system according to an example embodiment.

Embodiments of the present invention provide a method to use the inherent position/momentum correlations of photons to generate polarization entangled photons. In an example embodiment a compact design offers a robust, bright and compact source of polarization entangled photons. As the position and momentum correlations are inherent for the two photon state, the method according to example embodiments can be used irrespective of the generation process. Compared to existing polarization entangled photon sources, embodiments of the present invention can advantageously offer smaller footprint and robustness against mechanical vibrations and fluctuations in temperature or laser wavelength.

As embodiments of the present invention can use limited resources, they can be an ideal source for basic research involving entanglement. On the other hand, the compact, robust fiber-in fiber-out source according to an example embodiment can be useful in quantum communication networks distributing entanglement.

Example embodiments of the present invention convert the inherent position/momentum correlations to polarization entanglement. Advantageously, embodiments of the present invention can be used to convert any two photon state to an entangled state and hence can be used in any type of critical or non-critical phase matched designs. Moreover, the embodiments presented here can be extended to any system that can produce twin photons, i.e. photon pairs, with position or momentum correlation. Thus, embodiments of the present invention can be used to generate entangled photons with atomic linewidth, for example if applied to a heralded single photon generated by four wave mixing.

Explicit stipulations of example embodiments preferably are:
- Generation of polarization entanglement using position/momentum correlations
- The design can be used for both critically and non critically phase matched SPDC sources
- In the final compact design generated state is stable against small mechanical vibrations and temperature or fluctuations.
- The design can be extended to generate entangled photons with atomic linewidth.

Theoretical Background for Example Embodiments

A position correlated state of photons generated via SPDC is given by $$|\psi\rangle = \int_{-\infty}^{\infty} |x,x\rangle \, dx \quad (1)$$

where x denotes the position coordinate. Discretizing the continuous position variable as $$|X\rangle \int_{-\infty}^{0} |x\rangle \, dx \text{ and } |X'\rangle = \int_{0}^{-\infty} |x\rangle \, dx$$

the state becomes, $$|\psi\rangle = \frac{1}{\sqrt{2}} (|X, X\rangle + |X', X'\rangle) \quad (3)$$

The generated photons will be co-polarized in type 1 or type 0 SPDC. So the combined position-polarization state of the photon is $$|\psi\rangle = \frac{1}{\sqrt{2}} (|X, X\rangle + |X', X'\rangle) \otimes |H, H\rangle \quad (4)$$

By applying a position controlled polarization NOT gate, the state transforms into $$|\psi\rangle = \frac{1}{\sqrt{2}} (|X, X\rangle|H, H\rangle + |X', X'\rangle|V, V\rangle) \quad (5)$$

which is a GHZ state. Here, H and V denote the linear horizontal and vertical polarization states. The position information can be erased, for example, by coupling the photons into a single mode fiber, and the state becomes the famous polarization Bell state $$|\psi\rangle = \frac{1}{\sqrt{2}} (|H, H\rangle + |V, V\rangle) \quad (6)$$

Conversely, if we use the momentum correlation $|\psi\rangle = \int_{-\infty}^{\infty} |p, -p\rangle \, dp$, we can generate the state $$|\psi\rangle = \frac{1}{\sqrt{2}} (|H, V\rangle + |V, H\rangle).$$

Experimental Details of Example Embodiments

Example embodiments for the conversion of position correlations (can be used for momentum correlations also) to polarization entanglement are described herein. Two example embodiments involve interferometers while one example embodiment is a fiber-in fiber-out compact design involving spatially variant waveplates.

Embodiment 1

In embodiment 1, SPDC photons are created using critical or quasi phase matched nonlinear crystals (NLC). In embodiment 1, a periodically poled Potassium titanyl phosphate (ppKTP) is used as the NLC 101 which generates photon pairs, each entangled in momentum and position. With reference to FIG. 1A, two lenses 100, 102 are used such that the generation plane of the SPDC is imaged on to a wedge mirror 104 using 4f configuration. The wedge mirror 104 splits the photon pairs according to their generation position within the NLC 101. In this configuration the photon pairs are correlated in position, i.e. signal photons born in one position are correlated to the idler photons generated at the same position, with one signal photon and its correlated idler photon constituting the correlated photon pair, as given in Eq. (1). With the 4f imaging system, the wedge mirror 104 essentially discretizes the continuous position states in the NLC 101 resulting the state given in Eq. 3. It is noted that in another embodiment the wedge mirror can be used to split the photons on the basis of momentum as well. This can be done by keeping the wedge mirror after a lens (not shown) which collimates the SPDC output.

A half wave plate 106 at 45 degree converts the polarization of photon pairs with state |X',H⟩ to |X',V⟩. The state

|X,H⟩ passes through a half wave plate 108 oriented at 0 degrees which does not change its state. That is, the polarization of the first correlated photon pair group is rotated such that the polarization of the first correlated pair group in one path is at 90 degrees relative to the polarization of the second correlated photon pair group in the other path. The half wave plate 108 is introduced just to compensate the path lengths in embodiment 1. The two paths are combined in a polarizing beam splitter (PBS) 110.

The combined beam 111 passes through a spatial filter (SF) 112 which erases the spatial information to form the polarization entangled state at numeral 114. The spatial filtering of the combined beam can be done by a pinhole or by collecting it to a single mode fiber. The spatial overlap of the two beams 118, 120 is important for the entanglement quality. Therefore, optionally a dove prism 116 can be used to flip the spatial distribution of one path to overlap the two beams 118, 120 perfectly in which case there is no need to do any kind of spatial filtering, i.e. SF 112 can be omitted. To compensate the additional path length due to dove prism, a glass block 122 of equal length can be inserted in the other arm.

Figure 1B:
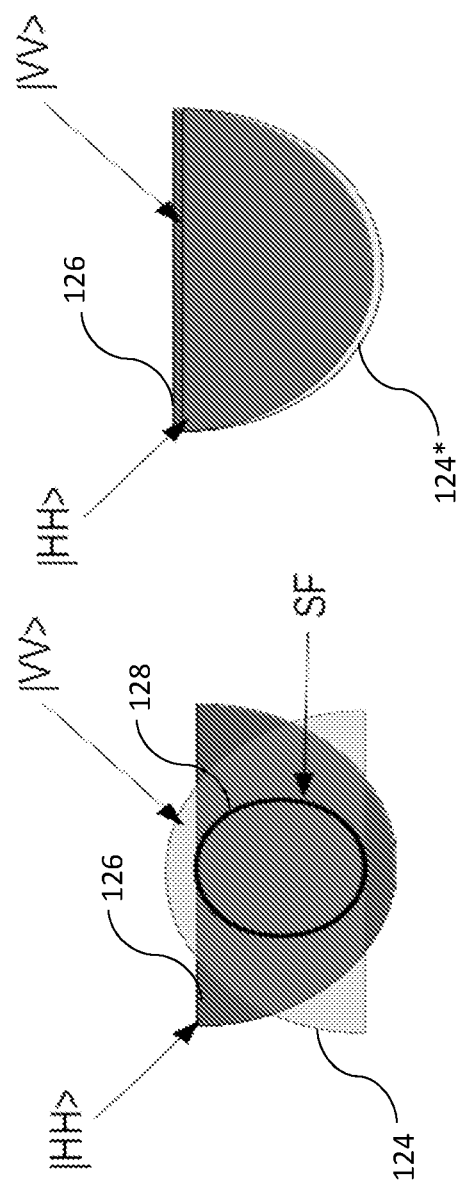
FIG. 1B shows schematic diagrams illustrating transverse spatial profiles of SPDC photons after the PBS in the method and system of FIG. 1A, specifically the left schematic diagram illustrating the profiles for a version of the example embodiment without dove prism, and the right schematic diagram illustrating the profiles for a version of the example embodiment with dove prism where the two distributions can be matched perfectly.

FIG. 1B shows schematic drawings illustrating the overlap of the two correlated photon pair beams that can be achieved when using the SF 112 (FIG. 1A) and when flipping the spatial distribution, respectively. Specifically, illustrated on the left is that the photon pairs generated in the upper semicircle 124 of the generation plane of the NLC 101 (FIG. 1A) partially overlap the photon pairs generated at the lower semicircle 126 of the generation plane, providing a reduced overlap region 128 after filtering using SF 112 (FIG. 1A). Preferably, when flipping one of the spatial distributions, here 124\*, maximum overlap can be achieved. In the practical case, both configurations are fine according to example embodiments when the photons are collected with a small collection focus (compared to the total beam distribution), for example when the photons are collected using a single mode fiber with a collection focus full width half maximum of 50 micrometres, which is much smaller than the total beam distribution shown in FIG. 1B.

Referring again to FIG. 1A, one of the mirrors 130 in the interferometer 132 is attached to a piezoelectric actuator (not shown) for the active stabilization of the interferometer 132. The pump laser 134 itself can be used to lock the interferometer so that it does not introduce any phase fluctuations. This can e.g. be done by locking into the destructive interference produced by the pump laser 134 at the other end of the PBS 110 after projecting to a diagonal polarization. The photons collected e.g. into a single mode fiber at numeral 114 will be entangled in polarization. The entangled signal photons and the entangled idler photons can be separated later on by, for example, a wavelength division multiplexer (WDM) or a dichroic beam splitter for output of respective polarization entangled photon pairs. The relative phase between |H,H⟩ and |V,V⟩ states advantageously depends only on the path length difference in the interferometer 126 and the pump 128 wavelength $$\phi = \Delta L\left(\frac{1}{\lambda_s} + \frac{1}{\lambda_i}\right) = \frac{\Delta L}{\lambda_p} \quad (7)$$

That is, the causes of instability in the phase is only due to the change in the pathlength difference in the interferometer 126 and the fluctuations in the pump 128 laser wavelength. Notably, unlike existing polarization entangled sources, the phase does not arise from the dispersion of photons in the non-linear material 130. That is, negligible wavelength dependent phase difference can advantageously be achieved.

Embodiment 2

Figure 2:
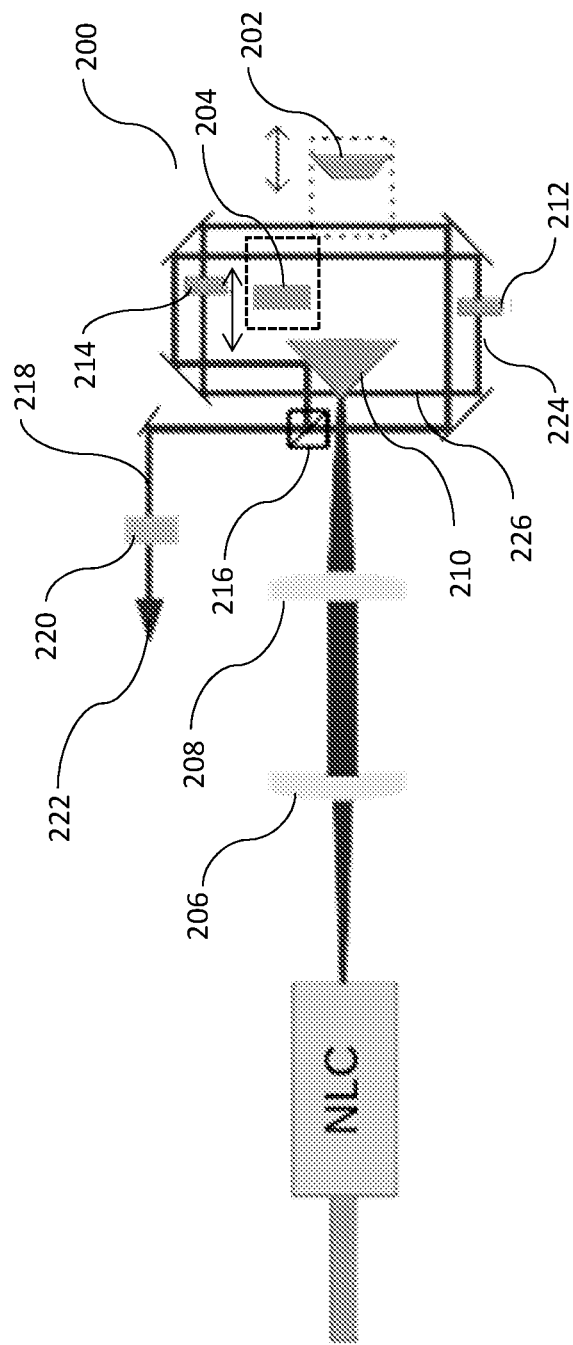
FIG. 2 shows a schematic diagram illustrating a method and system according to an example embodiment.

Embodiment 2 is conceptually similar to embodiment 1 where the photon pairs are split according to their position of origin using imaging lenses and a wedge mirror. However, in embodiment 2 a folded Mach Zehnder interferometer 200 is used in which the photon pairs hit the same mirrors, as shown in FIG. 2. This can advantageously increase the phase stability as the pathlength does not change due to the thermal expansion of the mirrors. With proper boxing up, the phase can be made stable for sufficiently large time interval and embodiment 2 advantageously doesn't require any active stabilization. In embodiment 2 also, the optional image inversion with a dove prism 202 and glass block 204 can be applied.

In embodiment 2 SPDC photon pairs are again created using critical or quasi phase matched nonlinear crystals (NLC). In embodiment 2, similar to embodiment 1, a periodically poled Potassium titanyl phosphate (ppKTP) is used which generates photon pairs entangled in momentum and position. Two lenses 206, 208 are again used such that the generation plane of the SPDC is imaged on to a wedge mirror 210 using 4f configuration. The wedge mirror 210 splits the photon pairs according to their position of generation. In this configuration the photon pairs are correlated in position, i.e. signal photons born in one position are correlated to the idler photons generated at the same position as given in Eq. (1). The wedge mirror 210 essentially discretizes the continuous position states resulting the state given in Eq. 3. It is again noted that in another embodiment the wedge mirror can be used to split the photon pairs on the basis of momentum as well. This can be done by keeping the wedge mirror after a lens (not shown) which collimates the SPDC output.

A half wave plate 212 at 45 degree converts the polarization of photon pairs with state |X',H⟩ to |X',V⟩. The state |X',H⟩ passes through a half wave plate 214 oriented at 0 degrees which does not change its state. That is, the polarization of the first correlated photon pair group is rotated such that the polarization of the first correlated pair group in one path is at 90 degrees relative to the polarization of the second correlated photon pair group in the other path. The half wave plate 214 is introduced just to compensate the path lengths in embodiment 2. The two paths are combined in a polarizing beam splitter (PBS) 216, with one of the beams reflected at the wedge mirror 210 towards the PBS 216.

The combined beam 218 passes through a spatial filter (SF) 220 which erases the spatial information to form the polarization entangled state at numeral 222. The spatial filtering of the combined beam 218 can be done by a pinhole or by collecting it to a single mode fiber. The overlap of the two beams 224, 226 is important for the entanglement quality. Therefore, optionally the dove prism 202 can be used to flip the spatial distribution of one path to overlap the two beams 224, 226 perfectly in which case there is no need to do any kind of spatial filtering, i.e. SF 220 can be omitted. To compensate the additional path length due to dove prism, the glass block 204 of equal length can be inserted in the other arm.

Again, negligible wavelength dependent phase difference can advantageously be achieved.

Embodiment 3

Figure 3:
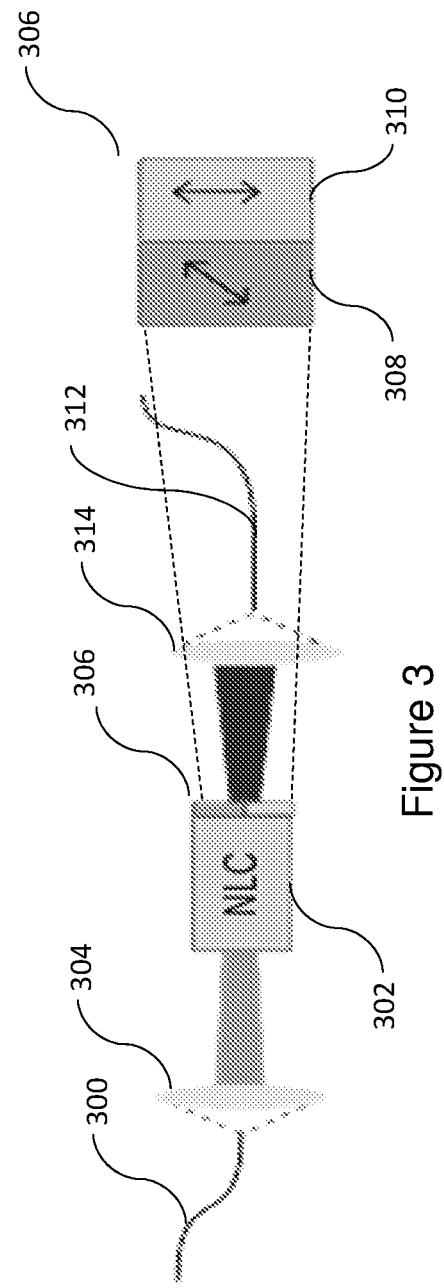
FIG. 3 shows a schematic diagram illustrating a method and system according to an example embodiment.

Embodiment 3 is a compact fiber-in fiber-out design which could be useful for the field deployment of entangled photons in quantum networks. FIG. 3A shows a top view of embodiment 3, in which the pump laser from a single mode fiber 300 is focused to the nonlinear crystal 302 using a focusing lens 304. At the other end of the crystal 302, a custom waveplate 306 is introduced. The custom waveplate 306 is formed by two half wave plates (HWP) 308, 310 (for the SPDC) bonded together side by side. The fast axis orientation of one HWP 308 is at 45 degrees with respect to the optical axis, while the other HWP 310 is oriented at 0 degrees. This will convert the polarization of the correlated photon pairs generated in one semicircle (here the left) of the generation plane into vertical while the polarization of photon pairs generated at the other semicircle (here the right) is unaffected. That is, the polarization of the first correlated photon pair group is rotated such that the polarization of the first correlated pair group in one path is at 90 degrees relative to the polarization of the second correlated photon pair group in the other path.

This can also be done with a single half wave plate with fast axis orientated 45 degrees to the beam axis acting only on one half of the SPDC distribution, noting that any added constant phase difference can be compensated later on. The correlated photon pairs are collected to a single mode fiber 312 using a lens 314. It is noted that other spatial filtering methods can be used as well in different embodiments. It is further noted that the fiber coupled laser at the input can be replaced to a laser diode in different embodiments. Pump, signal and idler photons at the output can be separated by a WDM or a dichroic beam splitter, or can be split by their momentum distribution, for example by using a wedge mirror. Again, negligible wavelength dependent phase difference can advantageously be achieved.

As embodiment 3 does not involve an interferometer, good phase stability can be achieved. Unlike existing Sagnac interferometer based sources, in the embodiments described above the phase does not depend on the nonlinear crystal temperature. The reason for the inherent phase stability stems from the fact that the photon pairs are generated during the same process within the same nonlinear medium, and that the pairs (from left and right semicircle) upon leaving the crystal are virtually indistinguishable from each other in the temporal domain. Thus the embodiments described above do not need unrealistic temperature stabilities. In embodiment 3, as $\Delta L=0$ (here it means that the path length difference for $|H,H\rangle$ and $|V,V\rangle$ is zero), the source will be stable against wavelength fluctuations or mode hopes of the pump laser. The custom waveplate 306 (or the single waveplate) is situated within the Rayleigh range of the generated correlated photon pairs. This is achieved by producing adequate pump and collection focal sizes and overlapping them by adjusting the corresponding lens positions. Also the effective coupling of the $|H,H\rangle$ and $|V,V\rangle$ photons have to be ensured, for example by using translation stages on lenses and/or fibers or by fixing lenses and fibers at the appropriate distances and positions. Unlike existing polarization entangled photon sources, in the embodiments described above, the phase does not depend on the angular stability of the crystals used.

Example Implementation of Embodiment 3

Figure 4:
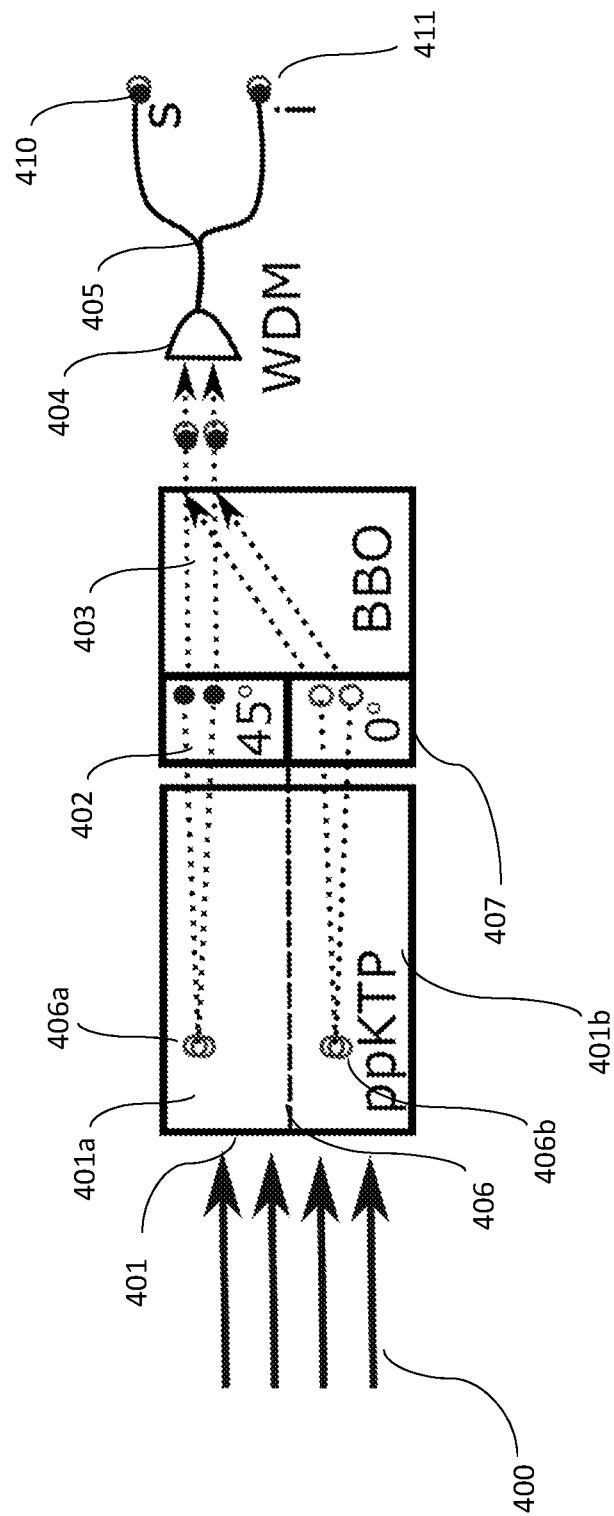
FIG. 4 shows a schematic diagram illustrating an example implementation of the system according to an example embodiment.

FIG. 4 shows a schematic diagram illustrating an example implementation of a method and system according to embodiment 3. As the custom waveplate 402 introduces scattering at the centre of the SPDC photons, it can be difficult to couple both $|HH\rangle$ and $|VV\rangle$ photons into a single mode fiber. The example implementation presented here combines the two photon pair paths after the custom waveplate 402 using a birefringent crystal 403 of sufficient length.

Specifically, FIG. 4 is a top view of the compact source. A collimated pump 400 is employed to generate SPDC photons. This can be launched through a fiber or a collimated laser diode. The SPDC photons, as soon as they exit the crystal 401, pass through the custom wave plate 402. The dashed line 406 represents the distinction between correlated photon pairs generated at the left (401a) and right (401b) part of the ppKTP crystal 401 in this example implementation. Filled and unfilled circles represent horizontally and vertically polarized photons, respectively. It will be appreciated that the generation of respective correlated photon pairs at the left and right parts 401a, 401b follow a statistical distribution, hence the representation in FIG. 4 is not intended to suggest simultaneous generation.

A WDM 404 splits the photons of the photon pairs according to their wavelength into signal (s) and idler (i). The polarization state of the photon pairs e.g. 409a generated at the left part 401a is converted to vertical (as indicated by the change from filled circled to unfilled circles at the custom waveplate 402) while the photon pairs e.g. 409b generated at the right part 401b remain unaffected.

The two polarization states are superposed using a birefringent crystal 403 via the spatial walk off. In this example implementation a Beta Barium Borate (BBO) crystal 403 with a cut angle of 28.8 degrees and a length of 4 mm is used. However, any other birefringent crystals such as Quartz or Calcite can be used in different implementations. The length of the birefringent crystal 403 is chosen such that it introduces a displacement that is half the pump 400 beam width. The superposed photons are then collected using the single mode fiber based WDM 404 which separates signal and idler photons for output of respective polarization entangled pairs, indicated at numerals 410 and 411.

Embodiments 1 & 2 can have a drawback of losses due to multiple reflections. With ideal focusing and collection conditions, embodiment 3 can offer brightness as high as the generated photon pair rate (single mode). The state generated is maximally entangled when the tip of the wedge mirror (in embodiments 1 & 2) or the boundary between the different axis orientations in the custom waveplate (in embodiment 3) is placed exactly at the centre of the SPDC photon distribution. Moving it off-center, will create non-maximally entangled states. It is noted that if a single waveplate is used in embodiment 3, the state generated is maximally entangled when one edge of the waveplate is placed exactly at the centre of the SPDC photon distribution.

The state generated in all embodiments does not critically depend on the pump coherence. The reason for the inherent phase stability stems from the fact that pairs are generated during the same process within the same nonlinear medium, and that the pairs (here from left and right portion of the crystal) upon leaving the crystal are virtually indistinguishable from each other in the temporal domain. This translates in a constant phase difference between pairs generated on either side of the crystal.

Similar designs can be used to convert the momentum correlations of photons as well according to example embodiments. For the momentum correlation, the photons can be split according to their momenta by discretizing the state in the far field, for example by using a wedge mirror (similar to embodiments 1 and 2) or by using a segmented HWP (similar to embodiment 3). The state generated will be $$|\psi\rangle = \frac{1}{\sqrt{2}}(|H, H\rangle + |V, V\rangle)$$

as the momenta of SPDC photons are anti-correlated. Alternatively, one can use a single lens that collimates the SPDC photons and use the wedge prism or segmented HWP after that.

Figure 5:
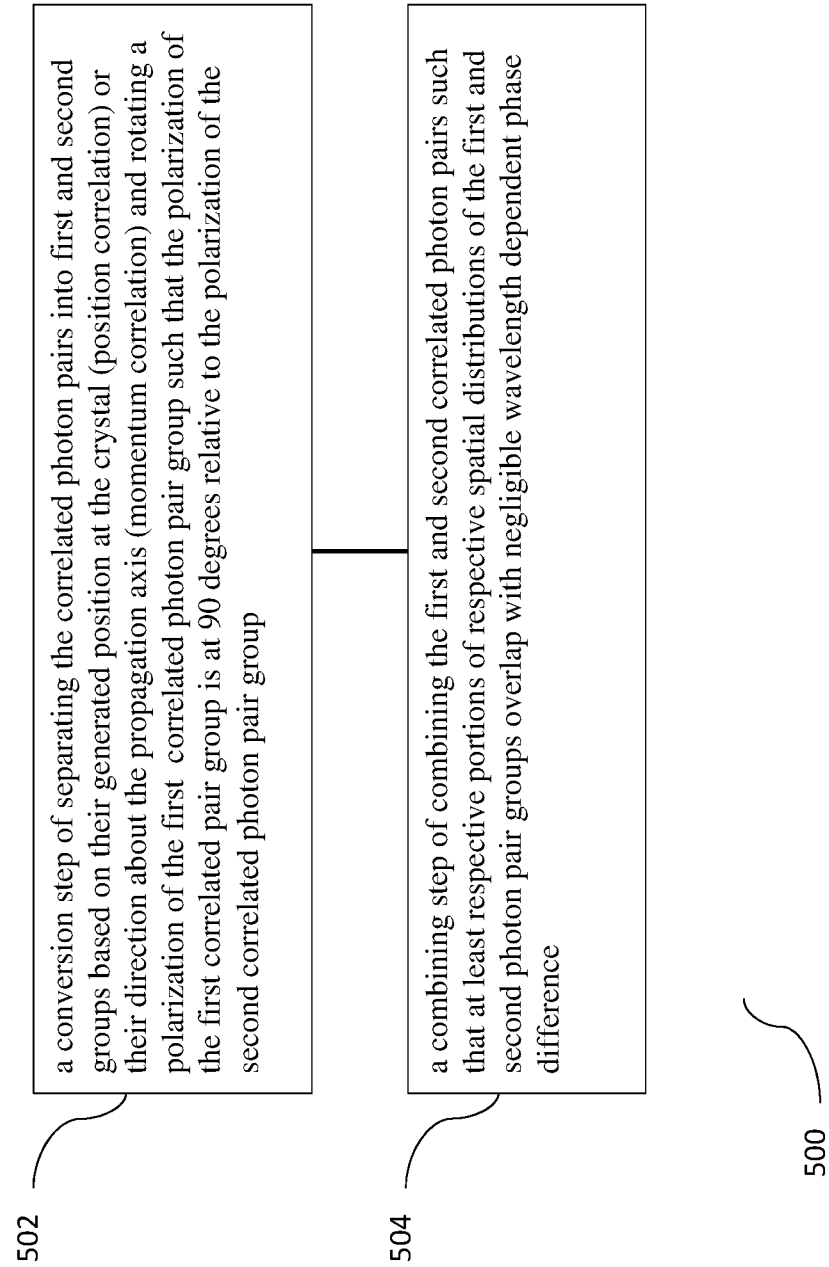
FIG. 5 shows a flow chart illustrating a method of converting position or momentum correlation of correlated photon pairs to a polarization entangled photon pair, according to an example embodiment.

FIG. 5 shows a flow chart 500 illustrating a method of converting position or momentum correlation of correlated photon pairs to a polarization entangled photon pair, according to one embodiment. At a conversion step 502, the correlated photon pairs are separated into first and second groups based on their generated position at the crystal (position correlation) or their direction about the propagation axis (momentum correlation) and a polarization of the first correlated photon pair group is rotated such that the polarization of the first correlated pair group is at 90 degrees relative to the polarization of the second correlated photon pair group. At a combining step 504, the first and second correlated photon pairs are combined such that at least respective portions of respective spatial distributions of the first and second photon pair groups overlap with negligible wavelength dependent phase difference.

The conversion step may comprise imaging a generation plane of the first and second correlated photon pairs onto a wedge mirror for splitting the first and second correlated photon pairs onto first and second paths, respectively.

The first and second paths may comprise different respective sets of mirrors in an interferometer configuration.

The first and second paths may comprise a same set of mirrors in a folded interferometer configuration.

The conversion step may comprise using a half wave plate at 45 degrees in the first path.

The conversion step may comprise using a half wave plate at 0 degrees in the second path to equalize respective path lengths of the first and second paths.

The combining step may comprise using a polarization beam splitter, PBS.

The combining step may comprise flipping the spatial distribution of the first or second correlated photon pair such that substantially the entire respective spatial distributions of the first and second correlated photon pairs overlap.

The flipping may comprise using a dove prism.

The method may further comprise compensating an additional path length caused by the flipping.

The compensating the additional path length caused by the flipping may comprise using a glass block.

The combining step may comprise spatially filtering the first and second correlated photon pair groups to erase spatial information such that the respective portions of the respective spatial distributions of the first and second correlated photon pair groups overlap.

The spatially filtering may comprise using a pinhole or collecting into a single mode fiber.

Pairs of the first and second correlated photon pair groups may be position correlated, and the conversion step comprises rotating the polarization of the first correlated photon pair group generated in a first portion of a photon generation distribution and within a Rayleigh range of the first and second correlated photon pair groups.

The first portion may be substantially one half of the photon distribution.

Pairs of first and second correlated photon pair groups may each be momentum correlated, and the conversion step comprises rotating the polarization of the first correlated photon pair group generated in a first portion of a photon generation distribution and outside a Rayleigh range of the first and second correlated photon pair groups.

The first portion may be substantially one half of the photon generation distribution.

The combining step may comprise spatially filtering the first and second correlated photon groups to erase spatial information such that the respective portions of the respective spatial distributions of the first and second correlated photon pair groups overlap.

The spatially filtering may comprise collecting into a single mode fiber.

The combining step may comprise using a birefringent crystal to introduce a displacement for overlapping the respective spatial distributions of the first and second correlated photon pair groups.

The method may comprise the step of generating the first and second correlated photon pairs groups.

In one embodiment, a module for converting position or momentum correlation of correlated photon pairs to a polarization entangled photon pair is provided, the module comprising:
  a polarization optics for rotating the polarization of a first group of correlated photon pairs such that a polarization of the first correlated pair group is at 90 degrees relative to a second group of correlated photon pairs; and
  a combiner for combining the first and second correlated photon pair groups such that at least respective portions of respective spatial distributions of the first and second photon pair groups overlap with negligible wavelength dependent phase difference.

The module may comprise a focusing optic and a wedge mirror, the imaging optic configured for focusing a generation plane of the first and second correlated photon pair groups onto a wedge mirror for splitting the first and second correlated photon pair groups onto first and second paths, respectively.

The first and second paths may comprise different respective sets of mirrors in an interferometer configuration.

The first and second paths comprise a same set of mirrors in a folded interferometer configuration.

The polarization optics may comprise a half wave plate at 45 degrees in the first path.

The polarization optics may comprise a half wave plate at 0 degrees in the second path to equalize respective path lengths of the first and second paths.

The combiner may comprise a polarization beam splitter, PBS.

The combiner may comprise an optical element for flipping the spatial distribution of the first or second correlated photon pair groups such that substantially the entire respective spatial distributions of the first and second correlated photon pair groups overlap.

The optical element for flipping may comprise a dove prism.

The module may further comprise a compensator for compensating an additional path length caused by the flipping.

The compensator may comprise a glass block.

The combiner may comprises a filter for spatially filtering the first and second correlated photon pair groups to erase spatial information such that the respective portions of the respective spatial distributions of the first and second correlated photon pair groups overlap.

The filter may comprise a pinhole or a single mode fiber.

Pairs of the first and second correlated photon pair groups may each be position correlated, and the polarization optics are configured for rotating the polarization of the first correlated photon pair group generated in a first portion of a photon generation distribution and within a Rayleigh range of the first and second correlated photon pair groups.

The first portion may be substantially one half of the photon generation distribution.

Pairs of the first and second correlated photon pair groups may each be momentum correlated, and the polarization optics are configured for rotating the polarization of the first correlated photon pair group generated in a first portion of a photon generation distribution and outside a Rayleigh range of the first and second correlated photon pair groups.

The first portion may be substantially one half of the photon generation distribution.

The polarization optics may comprise a segmented half wave plate.

The combiner may comprise a filter for spatially filtering the first and second correlated photon pair groups to erase spatial information such that the respective portions of the respective spatial distributions of the first and second correlated photon pair groups overlap.

The filter may comprise a single mode fiber.

The combiner may comprise a birefringent crystal to introduce a displacement for overlapping the respective spatial distributions of the first and second correlated photon pairs.

The module may comprise a source for generating the first and second correlated photon pairs.

In one embodiment, a source for generating polarization entangled photon pairs is provided, comprising the module of the above described embodiments.

Applications of embodiments of the present invention can include:

A light source for entanglement based quantum communication (based e.g. on embodiments 1, 2 or 3).

A compact, robust and bright source of polarization entangled photons (based e.g. on embodiment 3).

A position (or momentum) correlation to polarization entanglement conversion module (based e.g. on embodiments 1, 2 or 3). The module can be introduced to any heralded single photon source with position (or momentum) correlation. This module can be used to generate entangled photons with atomic linewidth, when applied to a system of four wave mixing producing twin photons from atomic transitions.

Embodiments of the present invention can have one or more of the following features and associated benefits/advantages:

| Feature | Benefit/Advantage |
| --- | --- |
| Conversion of position/momentum correlation into polarization entanglement | This allows to use methods and systems according to example embodiments to generate polarization entangled photons from any two photon state with inherent position/momentum correlation. |
| Relatively phase independent of photon dispersion in non-linear material | Robustness against small temperature fluctuations and mechanical vibrations. |
| Relatively phase independent of pump wavelength (embodiment 3) | Generated state is stable against frequency fluctuations or mode hopes in the pump laser. |

-continued

| Feature | Benefit/Advantage |
| --- | --- |
| Generated state does not depend on the coherence between multiple SPDC processes. | Laser with low coherence length (coherence length preferably larger than the crystal length) can be used. |
| Fiber-in fiber-out/compact design (embodiment 3) | A fiber communication compatible source of entangled photons |

Aspects of the systems and methods described herein such as the active stabilization of the interferometer may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. A method of converting position or momentum correlation of correlated photon pairs to a polarization entangled photon pair, the method comprising:
generating the correlated photon pairs in a crystal using a single pump beam;
a conversion step of separating the correlated photon pairs into first and second groups based on their generated position in first and second portions of a photon generation distribution of the single pump beam in the crystal or based on their direction about the propagation axis and rotating a polarization of the first correlated photon pair group such that the polarization of the first correlated pair group is at 90 degrees relative to the polarization of the second correlated photon pair group; and
a combining step of combining the first and second correlated photon pairs such that at least respective portions of respective spatial distributions of the first and second photon pair groups overlap with negligible wavelength dependent phase difference.

2. The method of claim 1, wherein the conversion step comprises imaging a generation plane of the correlated photon pairs onto a wedge mirror for splitting the first and second correlated photon pair groups onto first and second paths, respectively.

3. The method of claim 2,
wherein the first and second paths comprise different respective sets of mirrors in an interferometer configuration or wherein the first and second paths comprise a same set of mirrors in a folded interferometer configuration, or
wherein the conversion step comprises using a half wave plate at 45 degrees in the first path, using a half wave plate at 0 degrees in the second path to equalize respective path lengths of the first and second paths, or using both of the half wave plates.

4. The method of claim 1, wherein the combining step comprises flipping the spatial distribution of the first or second correlated photon pair groups such that substantially the entire respective spatial distributions of the first and second correlated photon pair groups overlap and the conversion step comprises equalizing the path lengths of the first or second correlated photon pair groups.

5. The method of claim 1, wherein the combining step comprises spatially filtering the first and second correlated photon pair groups to erase spatial information such that the respective portions of the respective spatial distributions of the first and second correlated photon pair groups overlap.

6. The method of claim 1, wherein pairs of the first and second correlated photon pair groups are each position correlated, and the conversion step comprises rotating the polarization of the first correlated photon pair group generated in a first portion of a photon generation distribution and within a Rayleigh range of the first and second correlated photon pair groups.

7. The method of claim 1, wherein pairs of the first and second correlated photon pair groups are each momentum correlated, and the conversion step comprises rotating the polarization of the first correlated photon pair group generated in a first portion of a photon generation distribution and outside a Rayleigh range of the first and second correlated photon pair groups.

8. The method of claim 1, wherein the combining step comprises spatially filtering the first and second correlated photon pair groups to erase spatial information such that the respective portions of the respective spatial distributions of the first and second correlated photon pair groups overlap.

9. The method of claim 8, wherein the combining step comprises using a birefringent crystal to introduce a displacement for overlapping the respective spatial distributions of the first and second correlated photon pairs.

10. A module for converting position or momentum correlation of correlated photon pairs to a polarization entangled photon pair, the module comprising:
a polarization optics for rotating the polarization of a first group of the correlated photon pairs such that a polarization of the first correlated photon pair group is at 90 degrees relative to a second group of the correlated photon pairs; and
a combiner for combining the first and second correlated photon pair groups such that at least respective portions of respective spatial distributions of the first and second photon pair groups overlap with negligible wavelength dependent phase difference,
wherein the first and second correlated photon pair groups are generated in first and second portions a photon generation distribution of a single pump beam in a crystal or have different directions about the propagation axis.

11. The module of claim 10, wherein the module comprises an imaging optic and a wedge mirror, the focusing optic configured for focusing a generation plane of the first and second correlated photon pair groups onto a wedge mirror for splitting the first and second correlated photon pair groups onto first and second paths, respectively.

12. The module of claim 11,
wherein the first and second paths comprise different respective sets of mirrors in an interferometer configuration or wherein the first and second paths comprise a same set of mirrors in a folded interferometer configuration, or
wherein the polarization optics comprises a half wave plate at 45 degrees in the first path, a half wave plate at 0 degrees in the second path to equalize respective path lengths of the first and second paths, or both the half wave plates.

13. The module of claim 10, wherein the combiner comprises an optical element for flipping the spatial distribution of the first or second correlated photon pair groups such that substantially the entire respective spatial distributions of the first and second correlated photon pair groups overlap, and a compensator for equalizing respective path lengths of the first and second correlated photon pair groups.

14. The module of claim 10, wherein the combiner comprises a filter for spatially filtering the first and second correlated photon pair groups to erase spatial information such that the respective portions of the respective spatial distributions of the first and second correlated photon pair groups overlap.

15. The module of claim 10, wherein pairs of the first and second correlated photon pair groups are each position correlated, and the polarization optics are configured for rotating the polarization of the first correlated photon pair generated in a first portion of a photon generation distribution and within a Rayleigh range of the first and second correlated photon pair groups.

16. The module of claim 10, wherein pairs of the first and second correlated photon pair groups are each momentum correlated, and the polarization optics are configured for rotating the polarization of the first correlated photon pair generated in a first portion of a photon generation distribution and outside a Rayleigh range of the first and second correlated photon pair groups.

17. The module of claim 10, wherein the combiner comprises a filter for spatially filtering the first and second correlated photon pair groups to erase spatial information such that the respective portions of the respective spatial distributions of the first and second correlated photon pair groups overlap, a birefringent crystal to introduce a displacement for overlapping the respective spatial distributions of the first and second correlated photon pair groups, or both the filter and the birefringent crystal.

18. A source for generating polarization entangled photon pairs, comprising the module of claim 10.

19. A method of converting position or momentum correlation of correlated photon pairs to a polarization entangled photon pair, the method comprising:
  a conversion step of separating the correlated photon pairs into first and second groups based on their generated position at the crystal or based on their direction about the propagation axis and rotating a polarization of the first correlated photon pair group such that the polarization of the first correlated pair group is at 90 degrees relative to the polarization of the second correlated photon pair group; and
  a combining step of combining the first and second correlated photon pairs such that at least respective portions of respective spatial distributions of the first and second photon pair groups overlap with negligible wavelength dependent phase difference;
  wherein the conversion step comprises imaging a generation plane of the correlated photon pairs onto a wedge mirror for splitting the first and second correlated photon pair groups onto first and second paths, respectively.

20. A module for converting position or momentum correlation of correlated photon pairs to a polarization entangled photon pair, the module comprising:
  a polarization optics for rotating the polarization of a first group of the correlated photon pairs such that a polarization of the first correlated photon pair group is at 90 degrees relative to a second group of the correlated photon pairs;
  a combiner for combining the first and second correlated photon pair groups such that at least respective portions of respective spatial distributions of the first and second photon pair groups overlap with negligible wavelength dependent phase difference; and
  an imaging optic and a wedge mirror, the focusing optic configured for focusing a generation plane of the first and second correlated photon pair groups onto a wedge mirror for splitting the first and second correlated photon pair groups onto first and second paths, respectively.

* * * * *